(12) United States Patent
Holliday

(10) Patent No.: US 6,437,247 B1
(45) Date of Patent: Aug. 20, 2002

(54) SNAP-FIT PROTECTIVE HOLDING ASSEMBLY FOR ELECTRICAL CABLES AND ENTRY TOOL THEREFOR

(76) Inventor: Randall A. Holliday, 11047 Tennyson Pl., Westminster, CO (US) 80030

(*) Notice: Subject to any disclaimer, the term of this patent is extended or adjusted under 35 U.S.C. 154(b) by 1267 days.

(21) Appl. No.: 08/592,562

(22) Filed: Jan. 26, 1996

Related U.S. Application Data

(62) Division of application No. 07/034,611, filed on Mar. 23, 1999, now Pat. No. 4,793,630, which is a continuation of application No. 07/675,183, filed on Mar. 26, 1991, now abandoned.

(51) Int. Cl.$^7$ ................................................ A02G 3/00
(52) U.S. Cl. ........................ 174/101; 30/169; 29/270; 29/278; 174/48
(58) Field of Search .................. 174/101, 48, 68.3; 138/92, 163; 52/718.01; 30/169; 29/270, 278

(56) References Cited

U.S. PATENT DOCUMENTS

| | | | | |
|---|---|---|---|---|
| 1,995,855 A | * | 3/1935 | Lee et al. | 174/48 |
| 2,087,640 A | * | 7/1937 | Du Prey | 174/101 |
| 2,982,570 A | * | 5/1961 | Lohman | 285/397 |
| 4,723,580 A | * | 2/1988 | Trautwein | 174/101 X |

\* cited by examiner

*Primary Examiner*—Kamand Cuneo
(74) *Attorney, Agent, or Firm*—John E. Reilly

(57) ABSTRACT

A protective cover assembly for electrical cables to be extended along a wall or floor surface includes interfitting U-shaped clip members and cover strips having complementary flange portions between their respective sidewalls, and the sidewalls of the clip members are provided with cable retainers to temporarily retain the cables in place during installation and spacer tabs to maintain uniform spacing with a baseboard or other trim. A re-entry tool is provided for positive separation or release of the cover strip from the clip members and specially formed slots are provided in the bases of the clip members for insertion of different types of anchor fasteners.

10 Claims, 1 Drawing Sheet

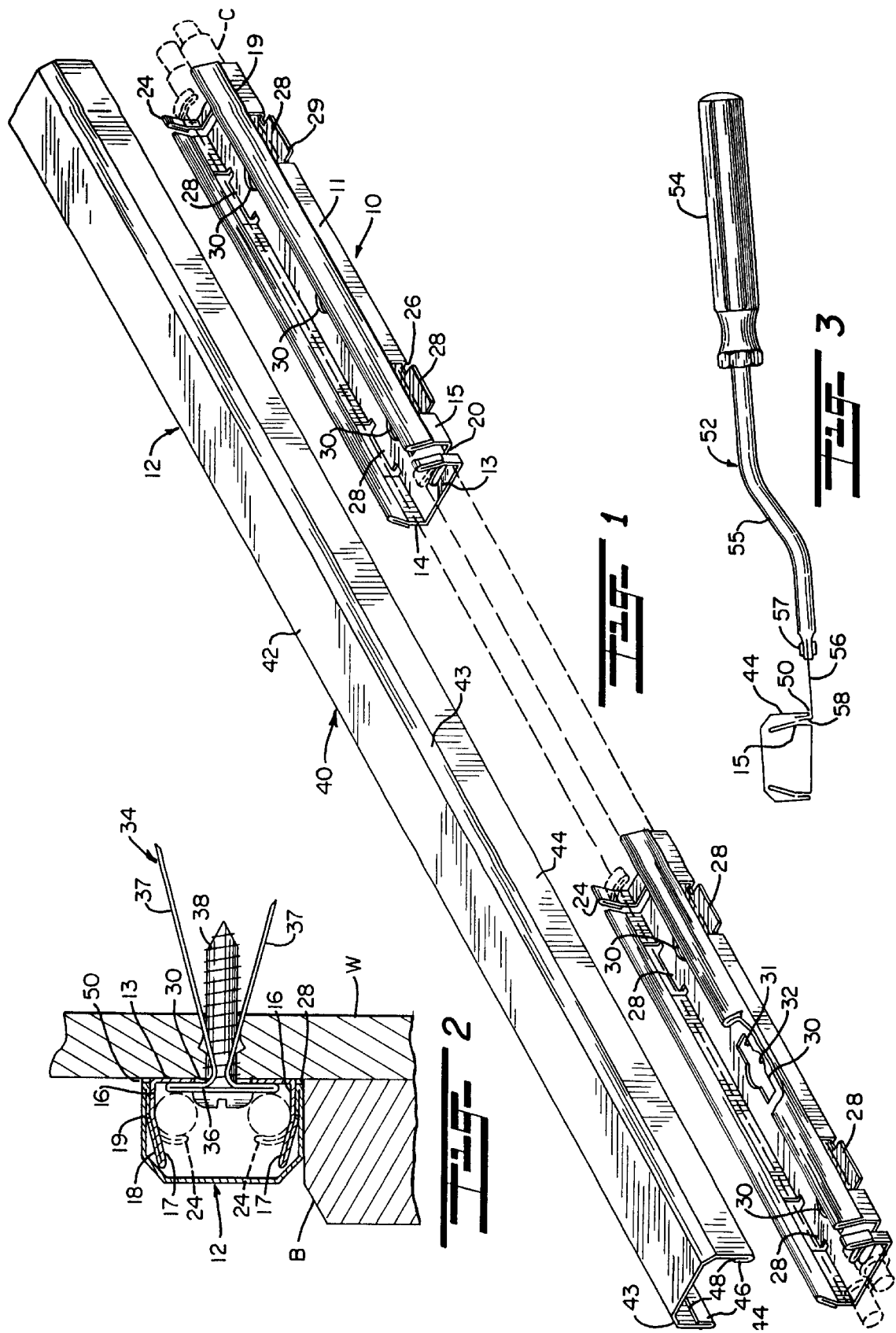

SNAP-FIT PROTECTIVE HOLDING ASSEMBLY FOR ELECTRICAL CABLES AND ENTRY TOOL THEREFOR

CROSS-REFERENCE TO RELATED APPLICATIONS

This application is a divisional application of Ser. No. 07/034,611, filed Mar. 23, 1993, now U.S. Pat. No. 4,793,630 which was a continuation of Ser. No. 07/675,183, filed Mar. 26, 1991 now abandoned, for SNAP-FIT PROTECTIVE MOLDING ASSEMBLY FOR ELECTRICAL CABLES AND ENTRY TOOLS THEREFOR, invented by Randall A. Holliday.

This invention relates to a protective covering or enclosure for electrical cables and the like; and more particularly relates to a novel and improved protective molding assembley in running cables along a floor or wall surface together with an entry tool for disassembling the components of the molding assembly.

BACKGROUND AND FIELD OF THE INVENTION

There is an ever-increasing demand and need for protective covering systems for running electrical cables in a building and specifically when it is necessary to extend the cable along an interior wall or floor surface.

Various cover systems have been devised to the end of simplifying their construction, reducing the time and labor necessary for installation of the cable and cover system and at the same time making the cover system as versatile as possible so as to be conformable for use in interior and exterior surfaces of a building.

In the past, various approaches have been taken to the construction of a snap-together clip and cover assembly. Typically, the clip is the base member which is anchored to the wall surface and preferably as close as possible to a baseboard or other molding strip so as to blend with the trim or molding and not unduly detract from the appearance of tho wall. Among other problems associated with present designs is to maintain adequate but uniform spacing between the clip or base member and the adjacent molding so that when the cover is engaged over the clip the cover will be in abutting relation, or substantially so, to the molding. Furthermore, it is desirable to incorporate into the clip a temporary retainer for positioning and retaining the cable in position within the clip preliminary to installation of the cover; and it is desirable that the retainers be formed as a unitary part of the clip member and particularly to be able to use the existing sidewall of the clip which can be bent into position over the cable so that the cable will not accidentally slip out of the clip as the cover is being installed.

Another desirable feature of cover assemblies of the type described is to so construct the clip and protective cover that the cover will spring into snap-fit relation to the clip so as to be securely retained against accidental separation; yet the parts may be positively released with the aid of an entry tool or key as well as to discourage attempts by unauthorized personnel to open or release the cover to gain access to the cable. For example, it has been proposed to establish interfitting engagement between a cover and clip by means of complementary sidewalls and to provide some form of temporary retainer for electrical cables within the clip portion. Representative patents are U.S. Pat. No. 4,602,124 to D. Santucci, U.S. Pat. No. 4,640,314 to D. E. Mock, U.S. Pat. No. 4,136,257 to P. W. Taylor and U.S. Pat. No. 1,217,398 to W. A. Bonnell. There is lacking any suggestion of employing tightly doubled-over metal flange portions which are capable of springing into snap-fit abutting relation to one another or to slot the flange portions at spaced intervals to form temporary retainers for the cable.

It has been proposed in the past to provide for interfitting sidewalls between a cover and clip in which the sidewalls of the cover substantially overlap the clip member and require some form of re-entry tool or key to release the cover, reference being made to U.S. Pat. No. 4,723,580 to J. B. Trautwein. However, in the present invention it is proposed to establish interfitting engagement between complementary, doubled-over flange portions between the sidewalls of a cover and clip in such a way as to discourage unauthorized removal or release of the cover but at the same time enable positive release through the utilization of a novel and improved re-entry tool.

Other patents of interest are U.S. Pat. No. 2,039,886 to A. Cohn, U.S. Pat. No. 4,166,195 to A. M. Schwab, U.S. Pat. No. 1,189,208 to F. C. Hodkinson and U.S. Pat. Nos. 3,262,083 and 3,721,762 to G. A. Gooding.

SUMMARY OF INVENTION

It is therefore an object of the present invention to provide for a novel and improved protective cover assembly for electrical cables and the like which is economical to construct and install while being readily conformable for use in securing an electrical cable to different wall or floor surfaces.

Another object of the present invention is to provide in a protective cover assembly for electrical cables for a novel and improved clip member having unitary cable retainers and spacer tabs to facilitate installation of the cover assembly in a minimum of time; and further wherein the clip member is provided with a novel and improved form of fastener slot for rapid installation utilizing different types of fasteners or wall anchors depending upon the composition of the surface receiving the fastener.

A further object of the present invention is to provide for a novel and improved protective cover assembly comprised of a two-piece clip and outer cover strip movable into interfitting engagement with the clip and in such a way as to prevent or discourage releasing or tampering with the cover strip; and in this connection to provide for a novel and improved form of entry tool specifically designed to disconnect the cover from the clip when necessary.

An additional object of the present invention is to provide for a novel and improved protective cover assembly for electrical cables and the like which facilitates attachment and positioning along a floor or wall surface and in uniformly and closely spaced relation to a baseboard or other trim and which lends itself well to construction out of sheet metal, extruded aluminum or plastic materials and is comprised of a minimum number of parts.

In accordance with the present invention, a preferred form of protective cover assembly for electrical cables may be extended along a wall or floor surface and comprises a plurality of elongated, generally U-shaped clip members, each clip member having a substantially flat base, opposite sidewalls each terminating in an upper end portion and each having a downwardly directed flange on an outer surface thereof, means for anchoring each clip member to a wall or floor surface, and an elongated generally U-shaped cover means having opposite side portions extending from a common panel, each side portion having an inturned, upwardly directed flange movable into interfitting or abutting engagement with one of the downwardly facing flanges on said clip member so as to be in a substantially common plane in retaining said cover means in position over said clip members.

Preferably, in the construction of the clip members, the external flanges on the sidewalls are defined by U-shaped return portions compressed tightly against the external surfaces of the sidewalls and the sidewalls have outwardly convergent inclined end portions to guide the side portions of the cover into overlapping interfitting engagement with the clip members. Correspondingly, the side portions of the cover have U-shaped return portions to define the inturned flanges and which are tightly compressed against the inner surfaces of the side portions.

The sidewalls of the clip members are provided with temporary retainers formed out of the sidewalls together with spacer tabs which extend laterally and outwardly away from the sidewalls at longitudinally spaced intervals to establish uniform spacing between the cover assembly and side edge of a baseboard or other trim strip so as to speed up installation and assure adequate spacing for proper engagement of the cover with the clip members.

Still another feature resides in the use of a special form of anchor slot to facilitate fastening with different types of fastener members in accordance with the composition of the wall surface and in such a way as to minimize the number of steps and time required for installation of anchor-type wall fasteners. As employed herein, the terms "inner" and "outer" refer respectively to locations near to or relatively away from the base of the clip member; and, at the same time, the terms "internal" and "external" are intended to refer respectively to the inside and outside surfaces of the clip and cover members.

The above and other objects, advantages and features of the present invention will become more readily appreciated and understood from a consideration of the following detailed description of a preferred embodiment of this invention when taken together with the accompanying drawings, in which:

BRIEF DESCRIPTION OF THE DRAWINGS

FIG. 1 is a somewhat exploded perspective view of a preferred form of protective cover assembly for electrical cables in accordance with the present invention;

FIG. 2 is a cross-sectional view of the preferred form of protective cover assembly shown in FIG. 1 but in assembled relation; and FIG. 3 is an end view illustrating a preferred form of entry tool used in disassembly of the cover assembly of the present invention.

DETAILED DESCRIPTION OF THE PREFERRED EMBODIMENT

Referring in more detail to the drawings, there is illustrated in FIGS. 1 and 2 a preferred surface mount raceway in the form of a protective molding or cover assembly 10 which is broadly comprised of a plurality of longitudinally spaced clip members 11 and an upper or outer cover 12. The assembly 10 is specifically designed for extension along a floor or wall surface and typically is anchored into the wall in proximity to a baseboard or other molding with electrical cables as designated at C fully encased within the molding assembly 10. Further, although not shown, the cover 12 may assume different configurations; and, while the cover strip 12 is shown as a straight run, may also be suitably formed as a tee, right angle, corner, end cap, reducing tee, coupling or reducer in accordance with conventional practice. The clip members are of a relatively limited length with respect to the cover 12 and are spaced at appropriate intervals to establish a firm anchor for the cover strip 12 in a manner to be described as well as to retain the cables C in place within the cover strip.

Considering in more detail the preferred construction and arrangement of the clip members 11, each is essentially in the form of an elongated channel and is of generally U-shaped cross-sectional configuration having a substantially flat base 13 and opposite sidewalls 14 and 15. Each sidewall 14 and 15 is of corresponding construction having a straight wall section 16 extending at right angles to and away from one side of the base 13 to merge into an outer inclined end portion 17. Each end portion 17 is doubled over and tightly compressed against the external surface of each respective sidewall to form an overhanging flange portion 18 which terminates in an external ledge 19 at the juncture of the straight section 16 and inclined section 17. In this way, the sidewalls converge in an outward direction away from the common base 13 and may be inclined at a relatively low angle on the order of 10° to 20° away from each straight portion 16. The clip members 13 as described may be stamped out of a sheet metal blank so as to have limited resiliency or springiness which is important in establishing a snap-fit relation with respect to the cover 12 in a manner to be described.

A gap or spacing 20 is formed in each of the sidewalls 14 and 15 but at opposite ends, as illustrated in FIG. 1, so that a relatively narrow segment 24 of each sidewall can be manually bent over each of the cables C, as shown dotted in FIG. 1, to serve as a temporary retainer or tie for holding each cable in place during the assembly process.

A second gap or spacing 26 is formed out of a straight portion 15 of each sidewall, and the resultant cut-out is trimmed to form a spacer tab 28. As noted from FIG. 1, the spacer tabs 28 are flattened into flush relationship to the base member 13 and extend laterally so as to project a slight distance beyond the sidewalls 15. In this way, the tabs 28 serve as a means of locating the clip members 11 in uniformly spaced relation to a baseboard or trim portion B, for example, as shown in FIG. 2 so as to allow sufficient spacing for installation of the cover 12. In this relation, the tabs 28 are preferably of rectangular configuration and elongated in the direction of the length of the clip members and provided with a straight edge 29 which will abut the edge of the baseboard or other trim portion and maintain a uniform spacing along the full length of the clip member.

Keyhole-shaped slots 30 are formed through the thickness of each base portions 13, there being a series of slots 30 in each clip member at uniformly spaced intervals, and each slot 30 having an elongated rectangular portion 31 extending in the direction of the length of the clip member and a centrally enlarged circular portion 32. The slot 30 as described facilitates installation of the conventional anchor fasteners, such as, Wall Grabb'r, manufactured and sold by Grabco, Inc. of Arlington Heights, Ill. One such anchor fastener is represented at 34 in FIG. 2 and comprises an anchor having an elongated rectangular head 36 with spring-like legs 37 which are spread by the entry or insertion of screw 38. The rectangular head 36 corresponds to the configuration of the rectangular slotted portion 31 but is slightly larger. In the past, it has been necessary to mark the distance between openings, drive in the anchors and then position the clips over the anchors followed by insertion of the screws 38. With the keyway slot 30 as shown, it is possible to drive the anchor legs 37 directly through the keyways 31 in the clips thereby substantially reducing the number of installation steps; and the circular opening 32 is small enough for a standard fastener, such as, a wood screw in mounting on surfaces that do not require a separate anchor.

The preferred form of cover strip 12 is also in the form of an elongated channel of generally U-shaped cross-sectional configuration and broadly is dimensioned to be installed in snap-fit, overlapping relation to the clip members 11 so as to fully enclose the clip members 11 and cables C within the resultant assembly. To this end, the strip 40 is comprised of a flat cover panel 42 having beveled side portions 43 and opposite sides 44. Preferably, the opposite sides 44 are disposed parallel to one another and perpendicular to the panel 42, each side 44 having an inturned doubled-over flange portion 46 which is tightly squeezed or compressed against the internal surface of each side 44 to define an outwardly directed ledge 48 in facing relation to the panel 42. The location of the ledges 48 on the internal surfaces of the sides 44 is dictated largely by the location of the external ledges 19 on the clip members so that when the cover strip is forced over the outsides of the sidewalls 14 and 15, the doubled-over or return portions 46 will slide downwardly along the inclined portions 18, forcing them inwardly somewhat until the ledges 48 clear the ledges 19. Once cleared, the sidewalls 14 and 15 are then free to spring back or return to their normally straight or right angle relation to the base 13 with the ledges 19 overlying the ledges 48. In this relationship, the inner free edges or ends of the sides 44 will cover the straight portions 16 of the sidewalls 14 and 15 except for a slight spacing 50 between each edge and the wall or floor surface W.

FIG. 3 illustrates a preferred form of entry tool or key 52 to be utilized in the disassembly or removal of the cover strip 12 from the clip members 11. The tool comprises a suitable handle 54, support bar 55 and a thin plate 56 affixed as at 57 to the bar 55 and diverging forwardly into an L-shaped blade-like end portion 58. As best seen from FIG. 3, the end portion 58 is insertable through the limited clearance 50 between the wall or floor surface W and the exposed side 44 of the cover strip 12. The edge is then pried upwardly between the exposed side 44 and the confronting sidewall 15 whereby to separate the ledges 16 and 48. Once separated, a slight lifting motion applied to the side 44 will advance both sides 44 of the cover strip 12 away from the clip member 11. This procedure is repeated for each clip member until the entire strip 12 is released and then can be fully removed to expose the cable C.

In a typical installation procedure, the clip members are spaced at intervals along a wall surface W and directly above a baseboard as represented at B. The spacer tabs 28 will establish a uniform spacing between the clip members and adjoining or abutting surface of the baseboard B so as to afford sufficient clearance for insertion of one side 44 of the cover strip 12. Each clip member 11 is anchored in place by first driving the legs 37 through one of the slots 30 and anchoring in place by threading in the screw 38. After the clip members 11 are anchored in place, the electrical cable or cables C are inserted and held in position within each of the clip members by bending over the retainers 24 at opposite ends of the clip to at least partially surround the cable(s). A straight section of a cover strip 12, as shown in FIG. 1, is then installed over the assembled cables and clip members 11 by forcing the sides 44 inwardly in overlapping relation to the sidewalls 14 and 15 until the ledges 48 move past the ledges 19 on the sidewalls whereupon the sidewalls will spring back into position to interengage with the sides 44. When necessary to run the cable around corners or to change direction, cover strips of the same cross-sectional configuration as the cover strip 12 are formed into corners or tees as required. Here, it is recommended practice to place a pair of clip members at 90° angles to one another at a corner and attach the corner cover strip to each of the clip members with opposite edges of the corner abutting the facing edges of the straight run cover strip.

If it should become necessary to release the cover strips, the re-entry tool 52 is placed into position as shown in FIG. 3 to pry the exposed side 44 away from the adjoining sidewalls 15 and to lift the side 44 away from the clip member. This will cause the opposite side 44 adjacent to the baseboard to pivot or cock sideways to a sufficient degree to clear the ledges 48 so that the entire cover strip can be released. For the purpose of illustration, the wall thickness of the flange portions 18 and of the ledges 19 will correspond to the thickness of the flange portions 46 and their ledges 48. The spacer tabs 28 are dimensioned to extend away from the sidewalls for a distance approximating twice the thickness of the sidewalls 14, 15 and the sides 44. The angle of inclination of the sidewalls is not critical but should be sufficient to guide the sides 44 of the cover strip into position. Similarly, the location of the ledges 19 should be somewhere along the straight side portions 16 of the sidewalls 14 and 15 to assure full engagement with the complementary ledges 48 on the sides 44.

It is therefore to be understood that while a preferred form of protective cover assembly has been herein set forth and described, various modifications and changes may be made in the construction and arrangement of parts as well as composition of materials without departing from the spirit and scope of the present invention as defined by the appended claims.

I claim:

1. A protective cover assembly for electrical cables for extension along a wall or floor surface comprising:

a plurality of elongated generally U-shaped clip members, each said clip member having a flat base, side walls extending outwardly from said base on opposite sides of said base, each said sidewall terminating in an upper end portion having a downwardly facing external ridge on an external surface of each said side wall;

elongated generally U-shaped cover means having an outer panel and opposite side portions extending inwardly from opposite sides of said panel, said cover means movable into overlapping relation to said clip members with said side portions movable into superimposed relation to said opposite side walls, each of said side portions having an upwardly facing internal ridge and means yieldingly urging said internal ridge into abutting engagement with said external ridge on each of said side walls to retain said cover means in position over said clip members, said ridges extending in a substantially common plane when disposed in abutting engagement with one another; and a re-entry tool having opposite longitudinal ends including a handle portion disposed at one of said longitudinal ends and an upwardly extending blade-like prying means disposed at another of said longitudinal ends opposite to said handle, said prying means insertable into a limited clearance space between said side portion and said side wall for separating said internal ridge from said abutting engagement with said external ridge when a prying force is applied to said prying means whereby said cover means is removable from said clip members.

2. A protective cover assembly according to claim 1, wherein said prying means is substantially L-shaped in configuration.

3. A protective cover assembly according to claim 2, wherein said re-entry tool includes a support bar disposed between said handle and said blade.

4. A protective cover assembly according to claim 3, wherein said support bar curves in at least one direction, thereby providing increased leverage for removing said cover means when said prying means is inserted between said side portion and said side wall.

5. A protective cover assembly according to claim 4, wherein a flat plate is fixedly mounted on an end of said support bar.

6. A re-entry tool in combination with a protective cover assembly for electrical cables adapted for extension along a wall or floor surface wherein said cover assembly comprises a plurality of elongated, generally U-shaped clip members engaged in snap-fitting relation to an elongated, generally U-shaped cover means, each of said clip members comprising laterally extending tab means for uniformly locating said clip member along the surface, and said re-entry tool comprising:

a thin plate and an upwardly extending, blade-like free end portion insertable into a limited clearance between one of said clip members and said cover means for lifting and separating said cover means away from each said clip member.

7. A re-entry tool in combination with a protective cover assembly according to claim 6, wherein each of said clip members has a flat base, side walls extending outwardly from said base on opposite sides of said base, each said side wall terminating in an upper end portion having a downwardly facing external ridge on an external surface of each said side wall.

8. A re-entry tool in combination with a protective cover assembly according to claim 7, wherein each said side wall comprises bendable cable retainer means for retaining cables against said flat base.

9. A re-entry tool in combination with a protective cover assembly for electrical cables adapted for extension along a wall or floor surface and having a plurality of elongated, generally U-shaped clip members engaged in snap-fitting relation to an elongated, generally U-shaped cover means, said re-entry tool comprising a flat plate and an upwardly extending, blade-like free end portion insertable into a limited clearance between said clip members and said cover means for lifting and separating said cover means away from each said clip member, wherein each of said clip members has a flat base, side walls extending outwardly from said base on opposite sides of said base, each said side wall terminating in an upper end portion having a downwardly facing external ridge on an external surface of each said side wall; and further wherein said cover means has an outer panel and opposite side portions extending inwardly from opposite sides of the panel, said cover means movable into overlapping relation to said clip members with said side portions movable into superimposed relation to said opposite side walls, each of said side portions having an upwardly facing internal ridge and means yieldingly urging said internal ridge into abutting engagement with said external ridge on each of said side walls to retain said cover means in position over said clip members, said ridges extending in a substantially common plane when disposed in abutting engagement with one another.

10. A re-entry tool in combination with a protective cover assembly according to claim 9, wherein said re-entry tool free end portion is insertable into a limited clearance between said side portion and said side wall for separating said ridges from said abutting engagement with one another when a prying force is applied to said plate.

* * * * *